United States Patent
Bencini

[11] 4,030,819
[45] June 21, 1977

[54] CINEMATIC EQUIPMENT SHUTTER SELECTOR MECHANISM

[76] Inventor: Roberto Bencini, c/o Dr.Ing. Misitano A.G. Via Padova, 217, 20127 Milan, Italy

[22] Filed: Feb. 4, 1974

[21] Appl. No.: 439,558

[52] U.S. Cl. .................................. 352/79; 352/221
[51] Int. Cl.² ........................................ G03B 41/00
[58] Field of Search ............................. 352/79, 221

[56] References Cited
UNITED STATES PATENTS

| | | | |
|---|---|---|---|
| 3,395,965 | 8/1968 | Teshi et al. | 352/79 |
| 3,439,980 | 4/1969 | Teshi et al. | 352/79 |
| 3,482,909 | 12/1969 | Becker | 352/79 |
| 3,537,106 | 10/1970 | Pickens et al. | 352/79 |
| 3,667,837 | 6/1972 | Agrati et al. | 352/79 |
| 3,811,759 | 5/1974 | Johnson | 352/79 |

FOREIGN PATENTS OR APPLICATIONS 1,251,653  10/1967   Germany .................... 352/79

*Primary Examiner*—L. T. Hix
*Assistant Examiner*—Alan Mathews

[57] ABSTRACT

The aperture selector mechanism for dual film projectors provides a change-over lever deplaceable between a upper (unlocked) and a depressed (locked) position, resilient means biasing the said lever in the upper (unlocked) position, first deplaceable means cooperable with the change-over lever to releasable lock the lever in the depressed, (locked) position and to release the lever when a super-8 film spool intermediale hub is cooperatively received in the drive spindle of the dual film projector and second deplaceable means preventing the standard 8 film spool intermediale hub to be cooperatively received in the said drive spindle of the dual film projector when the lever is in the upper (unlocked) position.

3 Claims, 12 Drawing Figures

CINEMATIC EQUIPMENT SHUTTER SELECTOR MECHANISM

This invention relates to an aperture selector mechanism for dual film cineprojectors which co-operates with film spool hubs adapted respectively for a super 8 film spool and a standard 8 film spool. For mounting the super 8 film spools there is provided a flanged intermediate hub and for mounting the standard 8 film spool there is provided another flanged hub the flange of which is larger than the flange of the hub for super 8 film spools.

The invention finds particular application in dual film projectors which are intended to be used for projecting both standard 8 films and super 8 films. These dual projectors have previously been equipped with an aperture selector that is manually operated. Such a selector comprises a displaceable aperture plate having two aligned apertures, one aperture corresponding to the standard 8 film and the other aperture corresponding to super 8 film.

These known dual film projectors have the disadvantage that the aperture selection is not related to presentation to the projector of a film spool to be co-operatively received which results in the possibility of the displaceable aperture plate being positioned for a super 8 film when a standard film has been presented for projection or vice-versa.

The present invention seeks to provide a selector mechanism which ensures that it is impossible for a super 8 film spool to be co-operatively received if the aperture slate is located for the projection of the standard 8 film spool and vice-versa.

According to the present invention there is provided an aperture selector mechanism for dual film projectors having a drive spindle, comprising in combination: a first intermediate hub for the super 8 film spools to be co-operatively received into said drive spindle of the dual film projector, a second intermediate hub for the standard 8 film spools to be co-operatively received into the drive spindle of the dual film projector, the said first hub having a relatively smaller flange and the said second hub having a relatively larger flange, an aperture plate having an aperture for the standard film and an aperture for super 8 film, an aperture change-over lever displaceable between a first and a second position, the first position corresponding to the selection of the aperture plate for the super 8 film spools and enabling the said first hub to be received into the said drive spindle, the second position corresponding to the selection of the standard 8 film aperture and enabling the said second hub for standard 8 film spools to be co-operatively received in the said drive spindle, first resilient means acting on the change-over lever to resilient bias said lever towards said first position, first deplaceable means co-operable with the change-over lever to releasably lock the change-over lever in the said second position and which cause the change-over lever to be automatically shifted in said first position under the reaction of the said first resilient means, when the said relatively smaller flange of the first hub interferes with the said first deplaceable means, second manually deplaceable means shaped as a press finger preventing the said second hub to be co-operatively received into the said drive spindle thanks to the physical interference with the relatively larger flange of the said second hub, only when the change-over lever is located in said first position.

It will be noted that in the preferred embodiment the change-over lever is displaced vertically so that said first position and said second position of the lever become upper and lower position, respectively.

An embodiment of the invention will now be described, by way of exmple only with reference to the accompanying drawings, in which.

Figure 5:
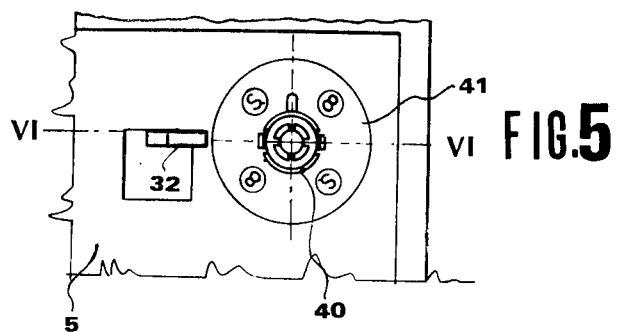
FIG. 5 shows a part of the projector of FIG. 2 from the side opposite to that shown in FIG. 2, namely from the outside with the change-over lever in the said first position.
Figure 7:
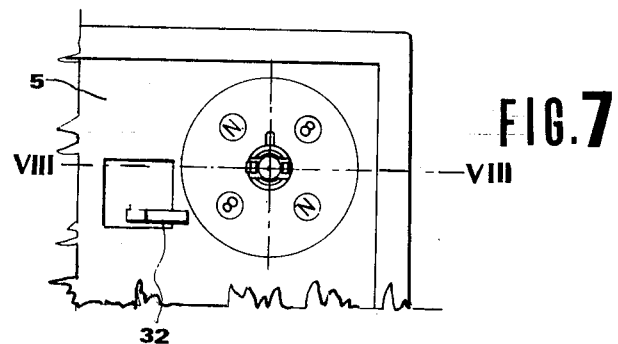
Figure 8:
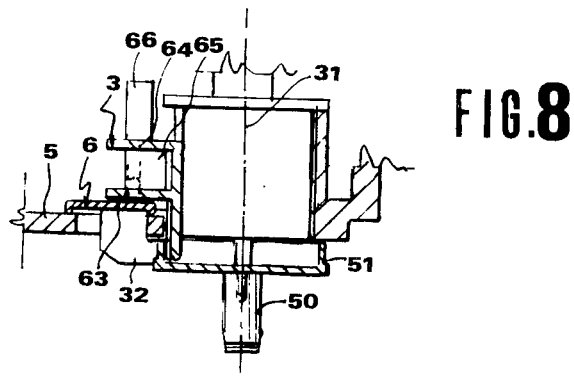
Figure 9:
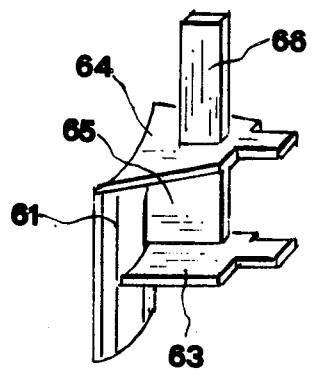
Figure 10:
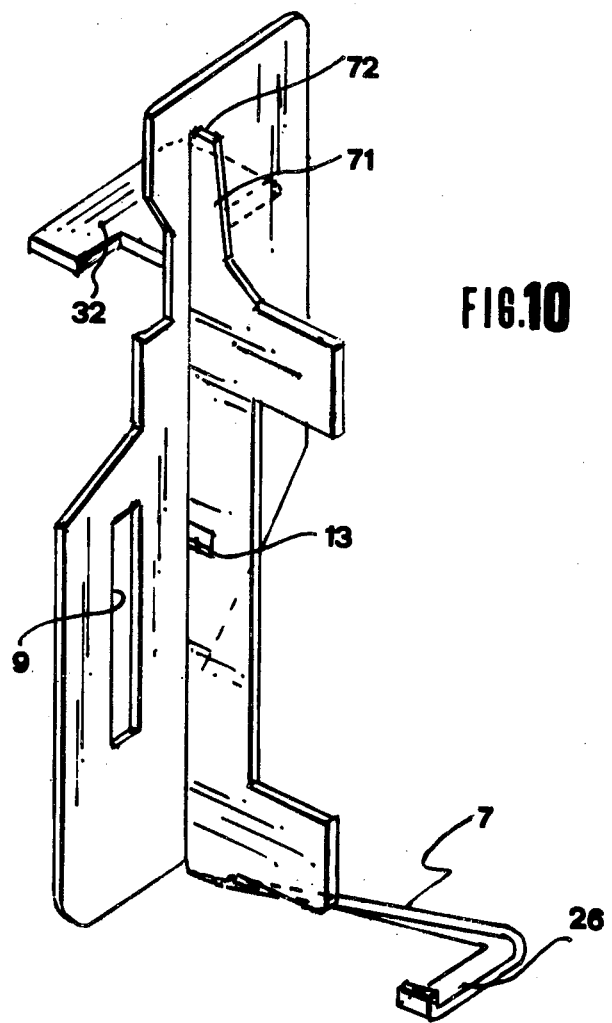
Figure 11:
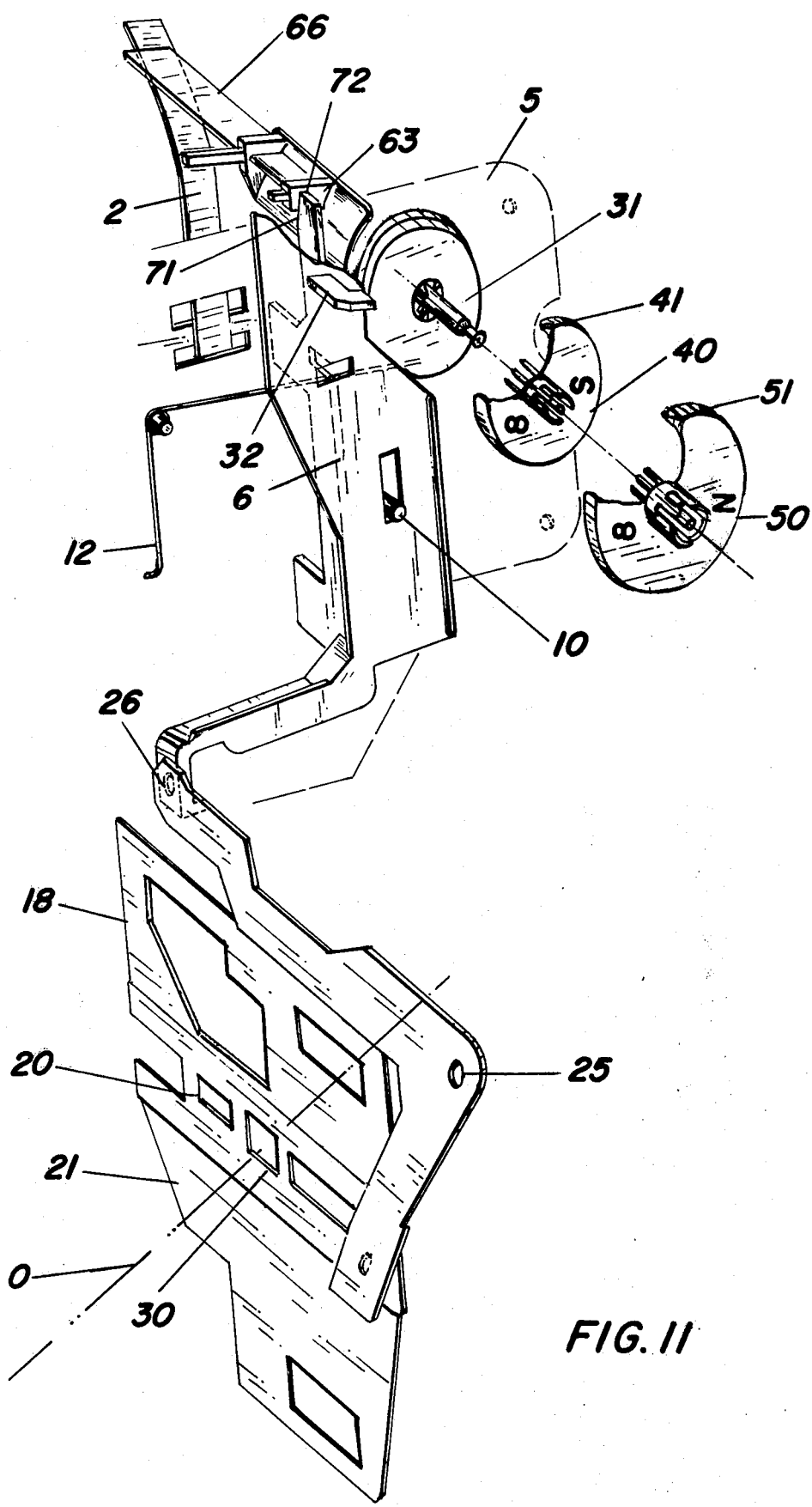

The FIG. 7 shows views similar to those of FIG. 5, but with the change-over lever located in its depressed (locked) position (second position);

FIG. 8 shows a section taken on the line VIII—VIII of the FIG. 7;

FIG. 9 shows a perspective view of a spring catch for the change-over lever; and FIG. 10 shows a perspective view of the change-over lever;

FIG. 11 is a perspective view of the whole aperture selector mechanism showing the change-over lever elastically polarized in its upper position, wherein only the super 8 hub may be operatively received.

Figure 12:
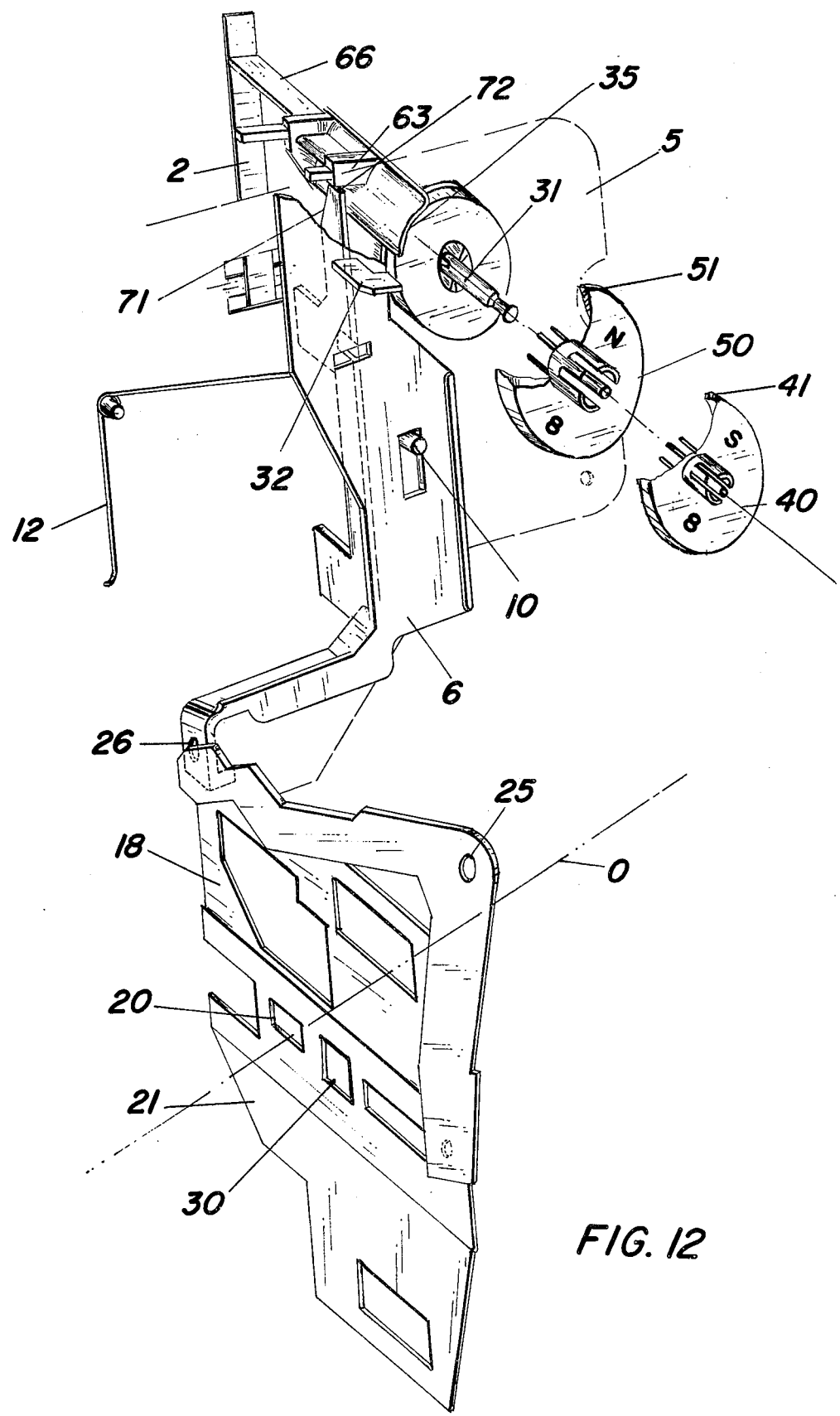

FIG. 12 is a perspective view of the whole aperture selector mechanism showing the change-over lever locked by the catch means in its depressed position, wherein only the standard 8 hub may be operatively received.

Figure 1:
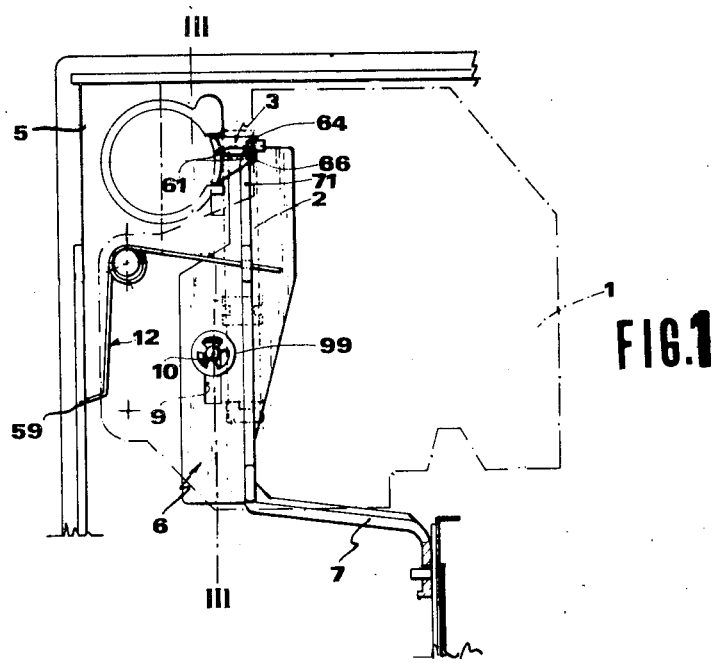
FIG. 1 shows in side elevation and partial section a film projector which embodies an aperture mechanism with its change-over lever located in its depressed (locked) position hereinafter referred as second position.
Figure 2:
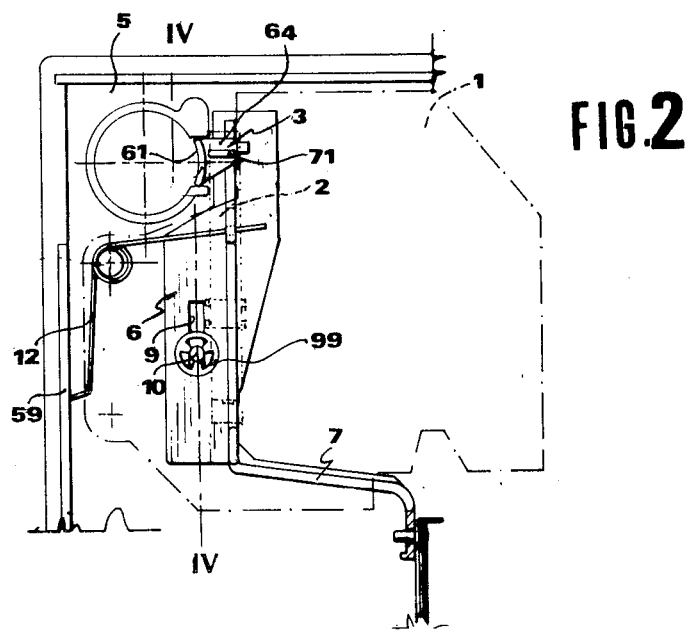
FIG. 2 shows the projector of FIG. 1 with the change-over lever located in its upper (unlocked) position hereinafter referred as first position.

As may be seen from FIGS. 1 and 2, the dual film projector has an upright wall 5 with a change-over lever 6 slidably mounted therein. The change-over lever 6 comprises an elbow portion 7 (see FIG. 10) and is slidably mounted by means of a slot 9 therein which co-operates with a guide stub 10 on the wall 5. The end of the stub 10 which projects through lever 6 carries a stop washer 99 (see FIGS. 3 and 4). The change-over lever 6 is biased by an L-shaped spring 12. One arm of spring 12 is secured in a slot 13 formed in the lever 6 (FIGS. 3 and 4) and the other arm of spring 12 abuts against an inwardly directed edge 59 of the projector housing. Thus, the lever 6 is resiliently biased upwards (FIGS. 1 to 4) towards the said first position.

Figure 3:
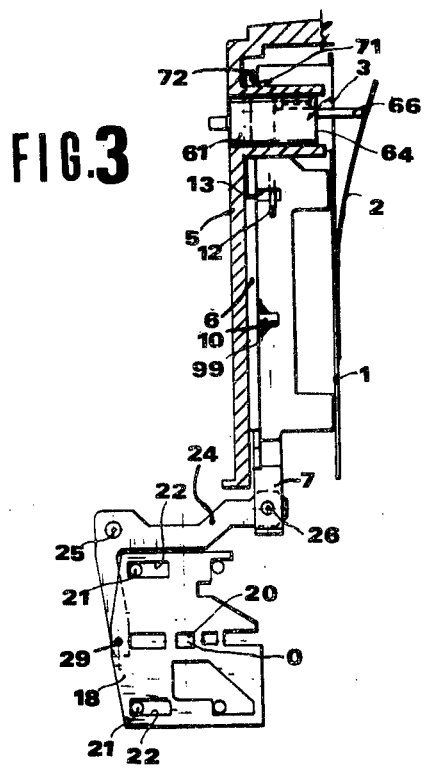
FIG. 3 shows a section taken on the line III—III of FIG. 2.
Figure 4:
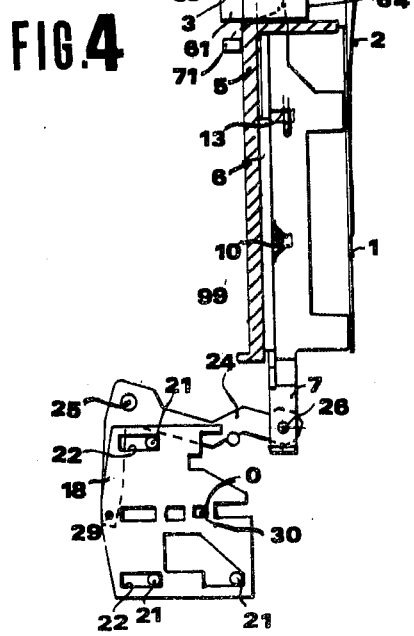
FIG. 4 shows a section taken on the line IV—IV of FIG. 1.

Referring now to FIGS. 3 and 4, the upper (first) position of the lever 6 is such that an aperture plate 18 mechanically coupled to lever 6, is located with an aperture 20 positioned for the projection of a super 8 film. From FIGS. 3 it will be seen that with mask 18 in this position, the aperture 20 for projecting super 8 frame film, is centered on the optical projection axis O. By comparison, FIG. 4 shows the lever 6 in its lower depressed (second) position in which the aperture plate 18 is located with aperture 30 for projecting standard 8 film centered on the projection axis O.

The plate 18 is displaceably mounted by means of guide studs 21 co-operating with slots 22 in the aperture plate 18. The motion of lever 6 is transmitted to the mask 18 by means of a bell-crank 24 coupled therebetween. The bell-crank 24 is pivotally mounted at 25 to the wall 5 and pivotally connected at 29 to the aperture plate 18. The crank 24, is also pivotally connected at 26 to the extension 7 of lever 6.

Figure 6:
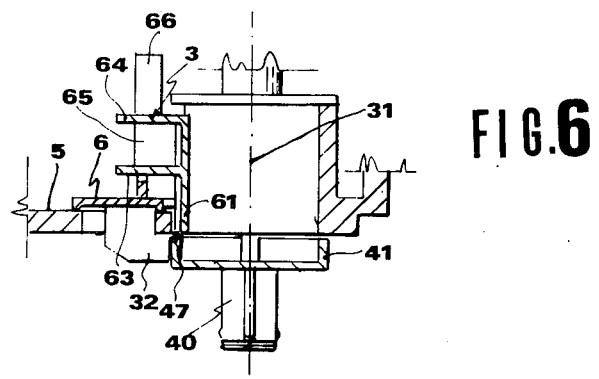
FIG. 6 shows a section taken on the line VI—VI of FIG. 5.

In FIGS. 1 and 2, a cover plate 1 is represented by a dash-dot line. Resilient biasing means formed by a leaf spring 2 is attached at one of its ends to the plate 1 and its other, free end acts on catch means 3 (see FIGS. 3 and 9). Catch means 3 acts under the bias of spring 2 to lock releasably the lever 6 in its depressed (second) position as will be further described hereinafter. Catch means 3 comprises a part-cylindrical main portion or arcuate shell 61, the inner diameter of which corresponds to the inner diameter of the flange 41 of a super 8 frame spool hub 40. The catch means 3 is constrained to reciprocate along a slot 69 formed in the wall 5. The main portion 61 of catch means 3 has two laterally extending wings 63 and 64 which are spaced by a rib 65. The second or upper wing 64 has a projection or finger 66 on which the free end of leaf spring 2 acts (FIGS. 3 and 4). Thus, the catch means 3 is resiliently biased such that the first or lower wing 63 is urged towards the wall 5 (FIG. 6). The end portion of each of the wings 63–64 engage an associated slot (not shown). These slots have a section complementary to that of the wings and are formed in an L-shaped edge portion of the cover plate 1. The movement of the wings along the slots cooperates to constrain a movement of catch means 3 to a translation movement only. The change-over lever 6 has a contoured rib 71, the contour of which is similar to an inclined plane. Rib 71 is spaced from the terminal portion of the change-over lever 6 such that the lever 6 is provided with a stop shoulder 72, which will be further described hereinafter.

In FIGS. 7, 8 and 9, there is shown the axle 31 for the film spool hubs and second displaceable means associated with the change-over lever 6. The second displaceable means is constituted by a press-finger 32 manually displaceable to displace the lever 6 between its upper (first) and lower (second) position and in the upper position of lever 6 prevents a standard 8 film spool being co-operatively received in the spindle 31 as will be further described hereinafter.

FIGS. 5 to 8 show a (first) hub 40 for the super 8 film spools and a (second) hub 50 for the standard 8 film spools, these spools being not shown since they are of conventional design. The hubs 40, 50 are provided in known manner with circular flanges 41–51 of different diameter. The outer diameter of the flange 41 is smaller than the inner diameter of the flange 51. The circular profile of the flange 41 is such that, when first hub 40 is co-operatively received, flange 41 aligns the main portion 61 of catch means 3 and thus when portion 61 projects beyond the outside surface of the wall 5, hub 40 interferes with portion 61 and causes the lever 6 to be shifted in its upper position as will be explained hereinafter. The circular profile of the flange 51 is such that the second displaceable means constituted by the press-finger 32 prevents the (second) hub 50 being co-operatively received when the change-over lever 6 is in its upper position. It will be noted that when (second) hub 50 is co-operatively received, the end portion 61 of catch means 3 is within the flange 51 and that when hubs 40, 50 are co-operatively received they are aligned co-axially with portion 61 and axle 31.

The mode of operation of the shutter selector mechanism according to the present invention, will now be described:

With the lever 6 located in its upper (first) position (FIGS. 2,3,5,6) the projector is adapted for the projection of super 8 films and to co-operatively receive (first) hub 40. The (first) hub 40 of super 8 film spool is free to rotate without its flange 41 contacting with the adjacent rim of main portion 61 of catch means 3.

If it is desired to project a standard 8 film, it is conventionally necessary to change the (first) hub 40 (used with super 8 film spools) with the (second) hub 50 (used with standard 8 film spools). With lever 6 in its upper position, the flange 51 of the hub (second) 50 interferes with the press-finger 32 of the lever 6 and it is necessary to press downwards the finger 32 of lever 6, in order to co-operatively receive hub 50. When the finger 32 has been depressed, the flange 51 does not more interfere with the finger 32, as can be seen from FIG. 7. The associated downward movement of change-over lever 6 results in the simultaneous shift of the mask 18 from its position as shown in FIG. 3 to that shown in FIG. 4 in which the aperture 30 is centered on the optical projection axis O.

In the lower (second) position of the lever 6, the catch means 3 positively and automatically lock the lever 6 in that depressed position by engagement of the first wing 63 with the shoulder 72 on lever 6. The first resilient biasing means constituted by return spring 12 is placed under tension but it is prevented from causing lever 6 to return to its upper position by the catch means 3. The catch means 3, is itself, resiliently biased towards the shoulder 72 by the leaf spring blade 2 constituting the second resilient biasing means.

For the projection of super 8 film, it is necessary to change the (second) hub 50 (suitable only for use with standard 8 film spools) with the (first) hub 40 (suitable for use only with super 8 film spools). When the lever 6 is in its lower position, then the rim 47 of flange 41 abuts against a rim 33 of main portion 61 of catch means 3 which projects beyond the wall 5 and causes the change-over lever to be shifted in its upper position. Namely, pushing the flange 41 against rim 35 causes the catch means 3 to be moved inside the projector. As a result first wing 63 of catch means 3 disengages from the shoulder 72 of lever 6 which causes the lever 6 to return to its upper position due to the bias of the return spring 12. Simultaneously, the mask 18 returns to the position shown in FIG. 3 in which aperture 20 is located for the projection of super 8 film.

In the upper (first) position of lever 6 (FIG. 3) the wing 63 is positively spaced from the wall 5. This is achieved because as lever 6 rises, the wing 63 slides along the rib 71 of lever 6. Thus, when co-operatively received the (first) hub 40 turns without interfering with the rim 33 of catch means 3.

Thus, the aperture selector mechanism according to this embodiment ensures that the mask 18 is located in the correct position for the projection of the selected film spool and at the same time ensures that a spool cannot be co-operatively received when the mask, and thus the aperture, is positioned for the alternate choice of standard 8 or super 8 films.

The FIGS. 11 and 12 show well how the selector aperture mechanism according to this invention operates. Particularly it should be remarked that it is not possible to perform an end-stroke co-operative assembling (cooperation) of the standard 8 film hub 50 when the change-over lever 6 is in its upper position (FIG. 11), because of the physical interference of the flange 51 of the standard 8 film hub 50 with the finger 32 of the change-over lever 6. Vice-versa, it is not possible to perform an end-stroke cooperative assembling of the super 8 hub when the change-over lever 6 is in its depressed (lower) position (FIG. 12), because an end-stroke assembling of the super 8 film hub 40 causes a release of the catch means 63, namely unlocking of the change-over lever 6 and the return of the latter in its upper position.

The hubs 50 and 40 are of a conventional construction and they form no part of my invention.

Of course if a super 8 film hub 40 is mounted when the change-over lever is in its upper position and similarly if the standard 8 film is co-operatively received when the change-over lever is in its depressed (locked) position, the aperture plate remains exactly located (as shown) and the cooperation of the hubs presents no further effects.

I claim:

1. An aperture selector mechanism for dual film projectors having a drive spindle, comprising in combination: a projector frame, a first intermediate hub for the super 8 film spools to be co-operatively received into said drive spindle of the dual film projector, a second intermediate hub for the standard 8 film spools to be co-operatively received into the drive spindle of the dual film projector, the said first hub having a relatively small flange and the said second hub having a relatively large flange, an aperture plate having an aperture for the standard 8 film and an aperture for super 8 film, an aperture change-over lever manually displaceable from a first to a second position, and automatically displaceable from the said second to the said first position, articulation means connecting the change-over lever to the said aperture plate, the first position corresponding to the selection of the aperture for the super 8 film, the second position corresponding to the selection of the standard 8 film aperture, first resilient means acting on the change-over lever to resiliently bias said lever towards said first position, second resilient means resiliently biasing a first deplaceable means to project outside the projector frame, said first deplaceable means co-operable with the change-over lever to releasably lock the change-over lever in the said second position under the action of the said second resilient means, the said first resilient means causing the change-over lever to be automatically shifted from the said second to the said first position, the said second resilient means releasably locking the said change-over lever in said second position, the said first deplaceable means unlocking the change-over lever when it is pressed by the relatively small flange of the said first intermediate hub, a press finger formed in said change-over lever preventing the said second hub from being co-operatively received in the said drive spindle due to the physical interference with the relatively large flange of the said second hub, when the change-over lever is located in said first position.

2. A mechanism as claimed in claim 1, in which said first deplaceable means comprises catch means having a part-cylindrical main portion of an inner radius of curvature corresponding to that of the flange of the said first hub, a projection extending from said part-cylindrical member, second resilient means acting on said projection to urge the catch means into a position in which said main portion interferes with the relatively smaller flange of the said first hub, the catch means further comprising a first laterally extending wing cooperating with a shoulder on the change-over lever so as to lock the latter in said second position.

3. A mechanism as claimed 2, in which the change-over lever further comprises an inclined plane profiled rib to co-operate with said first wing so as to cause said main portion of the catch means to be displaced as the change-over lever is displaced from said second position to said first position, the direction of this displacement being in a direction opposite to that in which said second resilient means act.

* * * * *